US006007417A

United States Patent [19]
Jones et al.

[11] Patent Number: 6,007,417
[45] Date of Patent: Dec. 28, 1999

[54] EXPANDABLE POULTRY DEBONER WITH IMPROVED STRIPPER DISK

[75] Inventors: Ben Tillman Jones, Jasper; Kenneth D. Dillard, Canton; Robert Steve Sosebee, Gainesville, all of Ga.

[73] Assignee: Dapec, Inc., Canton, Ga.

[21] Appl. No.: 08/902,222

[22] Filed: Jul. 29, 1997

Related U.S. Application Data

[63] Continuation-in-part of application No. 08/782,876, Jan. 14, 1997, Pat. No. 5,782,685
[60] Provisional application No. 60/010,450, Jan. 23, 1996.

[51] Int. Cl.⁶ .................................................. A22C 17/04
[52] U.S. Cl. .................................. 452/138; 452/136
[58] Field of Search .......................... 452/138, 136, 452/135

[56] References Cited

U.S. PATENT DOCUMENTS

| | | | |
|---|---|---|---|
| 3,456,284 | 7/1969 | Werner et al. | 17/1 |
| 3,470,581 | 10/1969 | Hopkins | 452/136 |
| 3,672,000 | 6/1972 | Martin et al. | 17/11 |
| 4,327,463 | 5/1982 | Martin | 17/11 |
| 4,377,884 | 3/1983 | Viscolosi | 17/11 |
| 4,380,849 | 4/1983 | Adkison et al. | 17/11 |
| 4,446,600 | 5/1984 | Hooley et al. | 17/11 |
| 4,488,332 | 12/1984 | Atteck et al. | 17/46 |
| 4,495,675 | 1/1985 | Hill et al. | 17/1 |
| 4,736,492 | 4/1988 | Hazenbroek et al. | 17/46 |
| 4,811,456 | 3/1989 | Heuvel | 17/1 |
| 4,843,682 | 7/1989 | Bowen | 17/1 |
| 5,064,403 | 11/1991 | Elsten | 452/135 |
| 5,090,940 | 2/1992 | Adkison | 452/136 |
| 5,173,076 | 12/1992 | Hazenbroek | 452/135 |
| 5,297,984 | 3/1994 | Gagliardl, Jr. | 452/136 |
| 5,782,685 | 7/1998 | Hazenbroek et al. | 452/138 |

OTHER PUBLICATIONS

Dapec, Inc. Service Manual for FA33500 Thigh Deboner, D–30, D–40 and D–50, 28 pages.

*Primary Examiner*—Willis Little
*Attorney, Agent, or Firm*—Thomas, Kayden, Horstemeyer & Risley

[57] ABSTRACT

Poultry parts (13) are placed on carrier trays (22) of a tray conveyor (14) and move on an endless loop conveyor first through a rectilinear loading run (24), then through a curved deboning run (26), and then through a lower return run (25). The curved deboning run extends about the deboning unit (35), which includes a stationary cam drum (36) and a revolving carrier assembly (38) that carriers the series of deboning modules (55) about the drum (36). Each deboning module becomes aligned with a carrier tray and is actuated by the cam tracks (81) of the stationary cam drum (36) so as to engage and push the bone of the poultry part through the aperture (63) of a bowed resilient stripper disk (61) that is mounted in a meat stripper disk assembly (56) having a disk retainer plate (132).

15 Claims, 7 Drawing Sheets

EXPANDABLE POULTRY DEBONER WITH IMPROVED STRIPPER DISK

CROSS-REFERENCE TO RELATED APPLICATION

This is an continuation-in-part of U.S. application Ser. No. 08/782,876 filed Jan. 14, 1997, now U.S. Pat. No. 5,782,685, which claims priority with respect to U.S. Provisional Application Ser. No. 60/010,450 filed Jan. 23, 1996.

FIELD OF THE INVENTION

The present invention relates in general to a method and apparatus for removing the bones from poultry and animal parts. More particularly, the present invention relates to a method and apparatus for deboning poultry thighs or wings of birds by urging the bone along its length and stripping the meat from the bone.

BACKGROUND OF THE INVENTION

In the processing and preparation of parts of poultry and animals such as poultry thighs for sale and consumption in the retail market, such as in restaurants and grocery stores, it is highly desirable to package and deliver the meat to the restaurants and grocery stores with the bones removed. Deboned meat can be easily cut-up and used in sandwiches or other food products where it is desirable to have the bones previously removed prior to cooking and serving.

An additional advantage of removing the bones from the meat during processing and before cooking is that the bones do not have to be cooked with the meat, thereby conserving heat energy. Further, the removal of the bone from the poultry part prior to cooking the meat allows the bone to be saved and used for bone meal or related products.

In the past, automated processes have been developed for the removal of meat from the bone of a poultry part, such as from the bone of a poultry thigh, by engaging the bone with a scraping tool and scraping along the length of the bone. For example, U.S. Pat. Nos. 3,672,000, 4,327,463, 4,495,675, and 4,736,492 disclose deboning apparatus having two or more notched scraping blades which engage the bone. The notches of the blades are moved from opposite sides of the bone and closed about the bone with the notches of the blades straddling the bone, and the bone is moved longitudinally through the blades. As the bone is moved through the notched blades, the blades progressively scrape the meat from the bone.

However, the raw meat has a tendency to cling tightly to the bone. Consequently, it usually is necessary for the scraper blades to engage the thigh bones in frictional contact to ensure the meat is completely scraped from the bone. A problem that arises with such prior art deboners is that the blades engaging the bone sometimes inadvertently gouge or chip and sometimes crack the bones as they scrape the meat from the bones. This might tend to create bone fragments that can become lodged in the stripped meat, which poses a health risk to the ultimate consumer who expects that when he or she purchases a "boneless" product, it is indeed completely boneless.

In order to avoid the creation of bone fragments during the deboning process, apertured elastic meat stripper disks have been substituted for the scraper blades. The bone is pushed longitudinally through the aperture of the disk and the resilient disk retards the movement of the meat, thereby separating the meat from the bone. U.S. Pat. No. 4,811,456 teaches the use of such elastic disks.

Additionally, U.S. Pat. No. 5,173,076 discloses an automated deboning apparatus which includes a series of elastic stripping disks, each of which is mounted adjacent and moves with a conveyor tray on which a poultry thigh is received and moved about a processing path. As the thigh is moved along the processing path, the thigh bone is urged through openings in the stripper disks, whereupon the meat of the thigh is progressively stripped from its bone. Such a system is, however, limited in size and in the number of deboning modules included therewith, which limits the production capacity of the apparatus. Conventional deboning apparatus also generally are not readily expandable to increase the number of parts that can be processed as needed.

Accordingly, it can be seen that it would be highly desirable to provide an improved method and apparatus for completely separating the meat from the bones of poultry parts or similar animal parts and reducing the risk of creating bone chips or fragments of bone that can become lodged in the meat of the parts, and with the apparatus being expandable to enable a greater quantity of poultry parts to be processed.

SUMMARY OF THE INVENTION

Briefly described, the present invention comprises an improved method and apparatus for removing the meat from the bones of poultry or animal parts, such as the thighs of poultry. In a preferred embodiment of the invention, the poultry deboner includes an elongated continuous tray conveyor having a series of poultry part carrier trays mounted thereon and movable about a substantially endless loop processing path, and a deboning unit mounted along the processing path of the tray conveyor. Each carrier tray is elongated with its length oriented normal to its direction of movement and includes a recess formed therein which receives and carries a poultry part as the carrier the tray is moved along its processing path. Wings or side flange portions are formed on each side of the semi-cylindrical recess of the carrier tray and reduce the likelihood of the poultry parts falling or being dropped into the machine. The poultry parts are loaded into the recesses of the carrier trays with the lengths of their bones extending normal to the path of travel as the carrier trays are moved along an upper run of the tray conveyor into the deboning unit.

The deboning unit includes a stationary cam drum having a pair of helical cam tracks extending thereabout, and a revolving carrier assembly extends about the cam drum. The carrier assembly includes a pair of rotary end plates positioned at opposite ends of the cam drum, and which are rotatably mounted on an axle that extends coaxially through the rotary end plate and through the cam drum. The end plates are rotated in unison by a motor about the axle so as to rotate with respect to the cam drum. A series of travel rods are arranged in a cylindrical array about the cam drum, arranged in pairs and mounted at their ends to the rotary end plates. A deboning module is movably mounted on each set of travel rods. Each deboning module includes a pusher assembly mounted on one side of the path of the carrier trays and an apertured meat stripper disk assembly mounted on the otherside of the path of the carrier trays which are aligned with each other and which are moved into alignment with a carrier tray of the tray conveyor and are rotated in timed relation with their carrier tray as the carrier tray is moved about the cam drum of the deboning unit.

The meat stripper disk assemblies are mounted to one of the rotary end plates which is positioned adjacent the processing path for the carrier trays. Each meat stripper disk assembly includes a resilient stripper disk mounted within a rigid stripper disk holder that stabilizes and supports the stripper disk. The stripper disk holder has a circular frame which defines a circular substantially cylindrical central aperture formed therethrough which is defined by an entrance opening and an exit opening formed in front and rear sides of the holder respectively.

The stripper disk has an annular peripheral flange for mounting in the circular frame of the disk holder and includes a substantially circular frontal extension which has a diameter slightly larger than the diameter of the entrance opening of the holder. When mounted in the holder, this frontal extension of the disk is radially compressed by the entrance opening of the disk holder, causing the resilient stripper disk to bow toward the exit opening of the holder such that the disk assumes a dome shape, with the front surface of the disk becoming concave and the rear surface becoming convex.

This change of shape of the disk also results in a change of shape of the centrally positioned bone-passing central aperture, from a cylindrical shape to a frusto-concial shape, with the entrance opening of the aperture being smaller than the exit opening of the aperture. This change of shape of the aperture presents a sharper circular edge at the front surface of the stripper disk, with the compressive forces that are applied by the circular frame of the disk holder to the disk being primarily directed through the disk to the smaller front opening. This tends to reinforce the strength of the front opening, so that its durability and effectiveness are increased.

To retain the disk in the holder, the annular peripheral flange of the disk is shaped to fit within a similarly dimensioned circular groove provided in circular frame of the stripper disk holder. In addition, the disk holder is provided with a ring shaped disk retainer which is mounted coaxially adjacent the exit opening of the disk holder and is displaced from the stripper disk when the disk is not flexed by a poultry part being pushed against the stripper disk. The circular opening of the disk retainer has a smaller diameter than the exit opening of the frame of the disk holder such that when a poultry part is urged against the stripper disk, the stripper disk will bow outwardly and will abut the disk retainer before bowing to the extent of dislodging from the holder.

The bone pusher assembly of each deboning module is mounted on and is laterally movable along the length of a pair of travel rods, initially positioned on the opposite side of each carrier tray from its aligned stripper disk. Each bone pusher assembly includes a hollow outer pusher sleeve having open front and rear ends, and is mounted on a carrier block slidably attached to the travel rods. A cam follower is affixed to the bottom of the carrier block and engages and rolls along a first cam track formed about the circumference of the stationary cam drum of the deboner unit. As the cam follower engages and moves along its cam track, a cupped engagement member mounted on a front end of the outer pusher sleeve is moved into engagement with the adjacent knuckle of the bone of the poultry part to urge the poultry part toward its aligned meat stripper disk assembly, with the bone being urged through the aperture of the stripper disk.

A hollow inner pusher sleeve and a pusher rod are telescopically mounted within each outer pusher sleeve, extending along the length of the outer pusher sleeve, with the pusher rod being concentrically disposed within the inner pusher sleeve. Each inner pusher sleeve and pusher rod is adapted to telescope into and out of the outer pusher sleeve with the inner pusher sleeve extending from the outer pushing sleeve to engage the stripper disk and the pusher rod extending from the inner pusher sleeve to engage and urge the bone of a poultry part through the aperture of the stripper disk.

A rear end of the inner pusher sleeve extends outwardly from the rear end of the outer pusher sleeve and a rear end of the pusher rod extends outwardly from the rear end of the inner pusher sleeve. The rear end of each inner pusher sleeve is attached to and supported by a carrier block slidably mounted on the travel rods. A cam follower is attached to each carrier block of each inner pusher sleeve and engages a second cam track formed about the surface of the stationary cam drum and extending approximately parallel to the first cam track. As the cam follower of each inner pusher sleeve moves along the second cam track, the inner pusher sleeve is urged laterally through the outer pusher sleeve so that a front end of each inner pusher sleeve telescopes out of the outer pusher sleeve to engage the stripper disk. Being disposed inside the inner pusher sleeve, the pusher rod is extended along with the inner pusher sleeve as the carrier block travels along the second cam track. When the inner pusher sleeve nears the stripper disk, the rear end of the pusher rod is urged forwardly by a cam wheel to extend a front end of the rod outwardly from the inner pusher sleeve. Due to its extension beyond the inner pusher sleeve, the pusher rod front end of the pusher rod momentarily moves through the aperture of the stripper disk so as to urge the thigh bone of the poultry thigh completely through the aperture of the stripper disk to complete the stripping of the meat from the bone. Upon completion of the removal of the meat from the bone, the meat and the bone drop away from the carrier trays and from the deboning modules for collection and further processing.

The construction of the present invention further enables the system to be expandable, by the addition of a longer conveyor with extra carrier trays mounted on the tray conveyor to enable an increased quantity of poultry parts to be processed as needed. The elongated endless tray conveyor travels through a rectilinear loading path toward the revolving carrier assembly, and as the carrier trays move along the loading path, the poultry parts are placed in the trays, with the bone of each part aligned with the semi-cylindrical recess formed in its carrier tray and extending across the length of the processing path. This arrangement permits a relatively small deboning unit to be combined with a relatively long conveyor for processing the thighs. If desired, the length of the conveyor, and therefore the length of the loading path, can be extended so that more than one operator can be stationed at the loading path for placing poultry parts on the trays. However, only one deboning unit is required, regardless of the length of the loading path. The speed of revolution of the revolving carrier assembly of the deboning unit can be increased to accommodate more parts being moved through the deboning system.

Thus, it is an object of this invention to provide an improved method and apparatus for reliably and expediently removing the meat from the bones of poultry parts.

Another object to this invention is to provide a method and apparatus for removing the meat from the bones of poultry parts with reduced risk of chipping the bones and creating bone fragments within the meat.

A further object of the invention is to provide a meat stripper disk assembly which prevents the resilient stripper disk contained therein from dislodging during the stripping process.

Yet another object of the invention is to provide a stripper disk which is more durable and more effectively separates the meat from the bone of a poultry part or animal part.

Another object to this invention is to provide an automated poultry deboner for reliably removing the meat from the bones of poultry parts, with the apparatus being expandable so as to enable more carrier trays to carry more poultry parts through the process.

Various other objects, features and advantages of the present invention will become apparent to those skilled in the art upon reading the following specification when taken in conjunction with the accompanying drawings.

DETAILED DESCRIPTION

Figure 1:
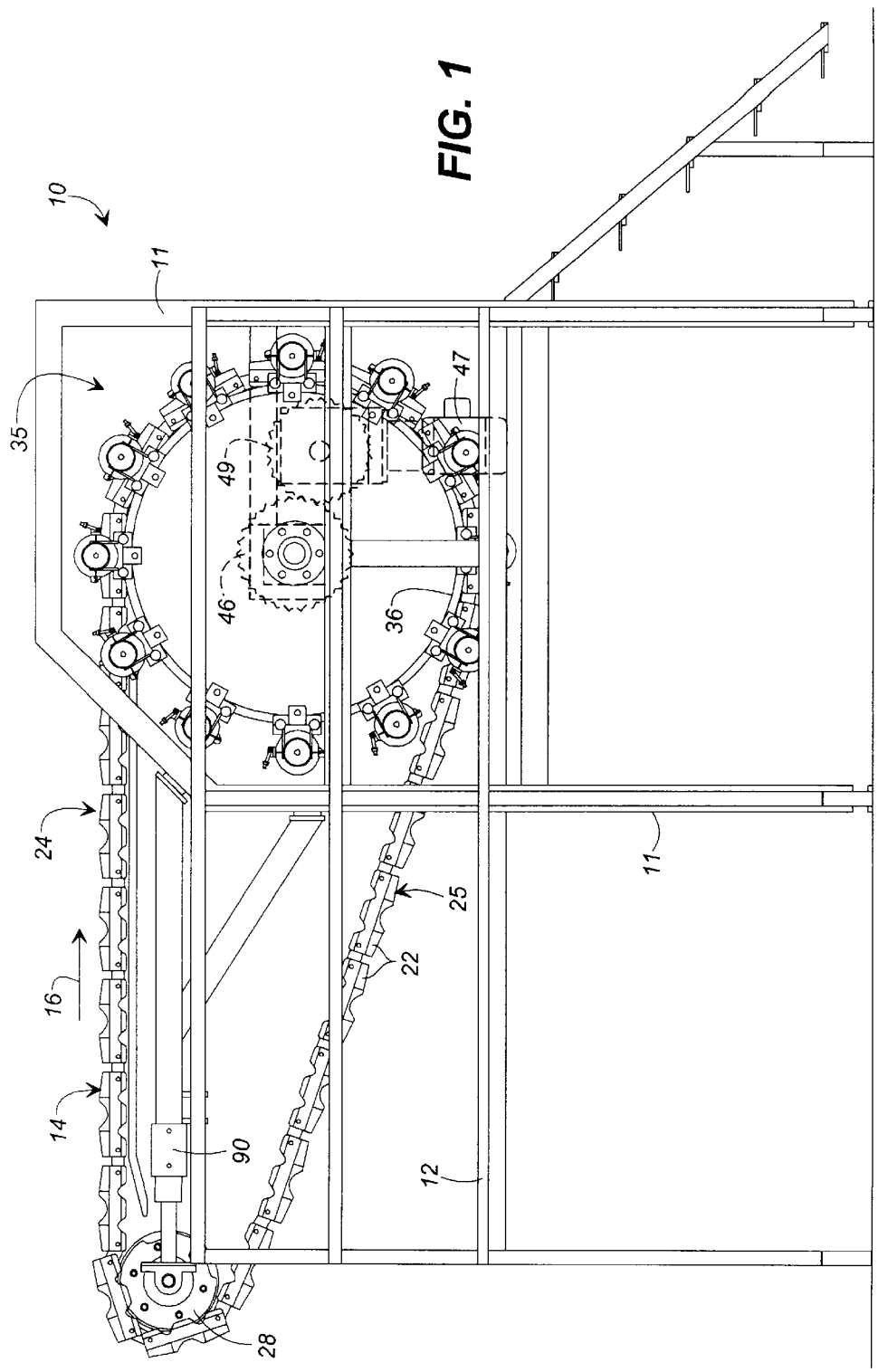
FIG. 1 is a side elevational view of the poultry thigh deboner.
Figure 2:
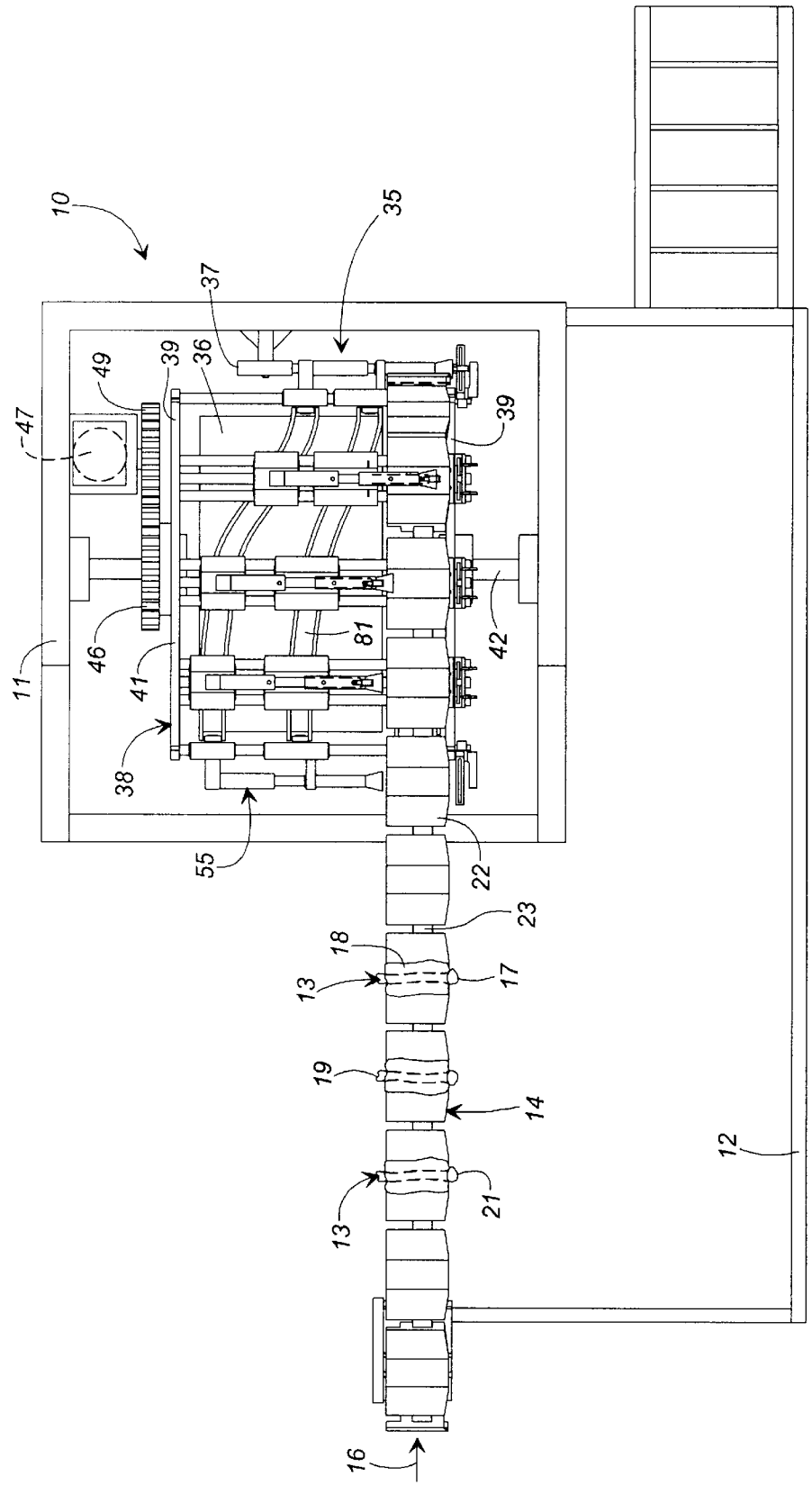
FIG. 2 is a plan view of the poultry thigh deboner.
Figure 3:
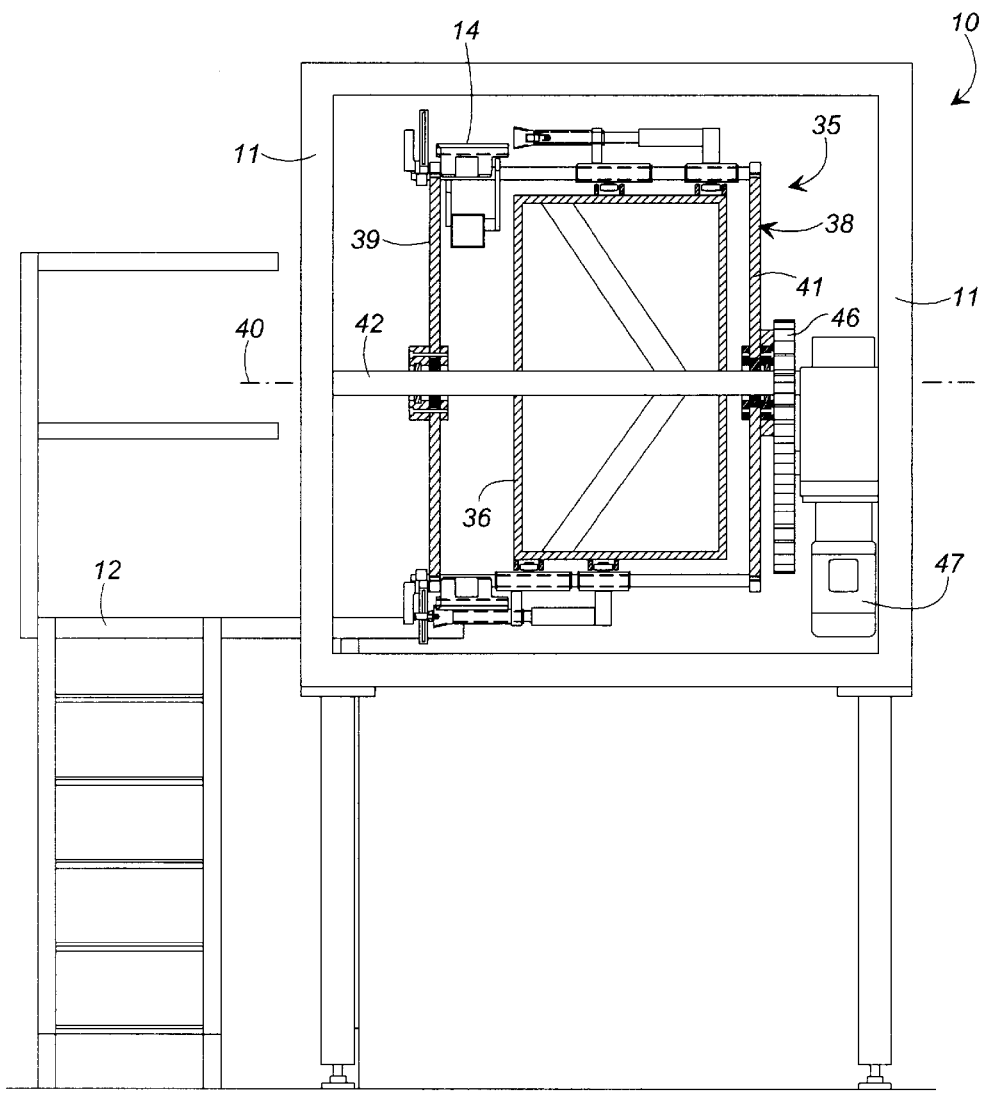
FIG. 3 is an end view of the poultry thigh deboner, taken in partial cross-section.

Referring now in greater detail to the drawings in which like numerals indicate like parts throughout the several views, FIGS. 1–3 illustrate the poultry thigh deboner 10 which includes a supporting framework 11 with an operator's platform 12 mounted thereto. The operator's platform 12 is positioned adjacent and generally in front of the supporting framework, attached thereto by welding. The platform provides a place for one or more workers (not shown) to stand while loading poultry parts 13 such as thighs (FIG. 2) onto a continuous tray conveyor 14 of the poultry deboner for movement along a processing path 16 for deboning of the poultry parts.

As shown in FIG. 2, each of the poultry parts 13 includes an elongated bone 17 shown in dash lines surrounded along its length by meat 18. The bones further include a large knuckle end 19 and a small knuckle end 21. The poultry parts are loaded on the tray conveyor in a horizontal, flat-lying attitude for transport along the processing path 16, with the length of the bone extending at a right angle with respect to the direction of the processing path, as shown in FIG. 2.

As FIGS. 1, 2, and 11–14 illustrate, the tray conveyor 14 is a substantially endless loop conveyor that includes a series of carrier trays 22 connected in series by linkages or couplings 23 and extended in a substantially endless loop along the processing path 16. The tray conveyor further includes an upper rectilinear loading run 24 and a lower return 25 and a curved deboning run 26. An idler sprocket 28 is mounted between the upper loading run 24 and the lower return run 25 adjacent the loading end 26 of the tray conveyor, with the tray conveyor extending thereabout for guiding the tray conveyor upwardly and over and along its upper run.

Figure 11:
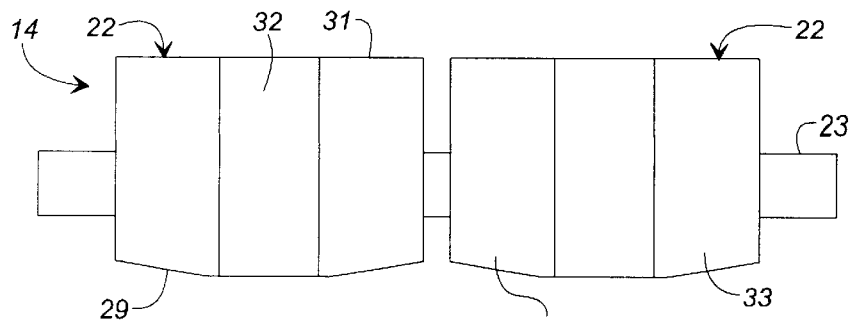
FIG. 11 is a top view of adjacent carrier trays.
Figure 12:
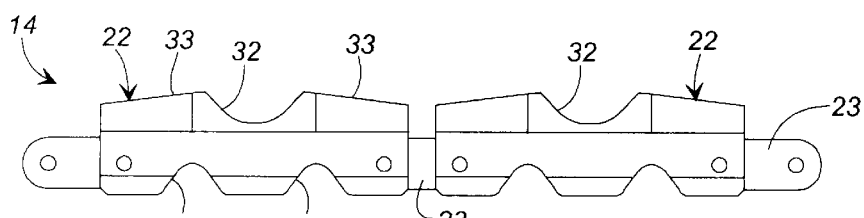
FIG. 12 is a side view of adjacent carrier trays.
Figure 13:
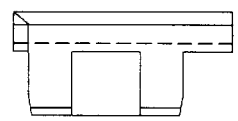
FIG. 13 is an end view of a carrier tray.

As shown in FIG. 11, each of the carrier trays 22 is an approximately rectangularly shaped plate formed from a plastic such as nylon, or a metal such as stainless steel, and having a front edge 29, a rear edge 31 and a semi-cylindrical recess 32 formed approximately along the center of each tray extending between its front and rear edges. Each semi-cylindrical recess 32 is sized and shaped to receive and support a poultry part 13 therein. The semi-cylindrical recesses each function as a cradle or holding means for receiving and holding the poultry parts with the bones extending along the length of the recess. Each carrier tray further includes a pair of side flanges or wings 33 that extend laterally from the side to the semi-cylindrical recesses. The wings 33 function to prevent the poultry parts 13 from falling or being dropped into the machine as they are loaded into the semi-cylindrical recesses of the carrier tray by an operator(s). Arched grooves 34 (FIG. 13) are formed in the underside of each carrier tray and form protrusions therebetween, and the grooves and protrusions engage teeth formed in the idler sprocket 28 as the carrier trays move thereabout.

As shown in FIGS. 1–3, a deboning unit 35 is positioned adjacent the downstream end 27 of the loading run 24 of the tray conveyor 14. The deboning unit is mounted to and supported by the support framework 11, with the tray conveyor extended and revolving thereabout. The deboning unit includes a substantially cylindrical stationary cam drum 36 affixed in a stationary position to the support frame by axle 42. The cam drum 36 is formed from steel or similar rigid material and a revolving carrier assembly 38 is rotatably mounted about the cam drum. The carrier assembly 38 includes a pair of rotatory end plates 39 and 41 mounted adjacent the opposite ends of the cam drum 36, as illustrated in FIG. 3, with the end plates being spaced from the cam drum 36. Each of the end plates is a circularly shaped disk formed from steel or similar material and is each rotatable with respect to the cam drum 36 about the axis of rotation 40, coincident with axle 42, in the direction of the processing path 16.

The rotary end plates 39 and 41 are rotatably mounted on the axle 42 that extends through the cam drum 36 and through the rotary end plates, and the axle 42 is connected at its ends 43 to the supporting framework 11. A sprocket 46 is mounted about the axle 42 adjacent end plate 41 and is attached to the end plate 41. As illustrated in FIGS. 1–3, a drive motor 47 is mounted to the framework, adjacent an end of the drive shaft. The drive motor 47 includes a drive shaft that drives a drive sprocket 49. The drive sprocket 49 engages the sprocket 46 attached to end plate 41 in a driving relationship such that as the drive motor rotates its drive shaft, the drive sprocket is rotated in engagement with the sprocket, which in turn causes the deboning unit 35 to revolve about the cam drum 36.

Figure 4:
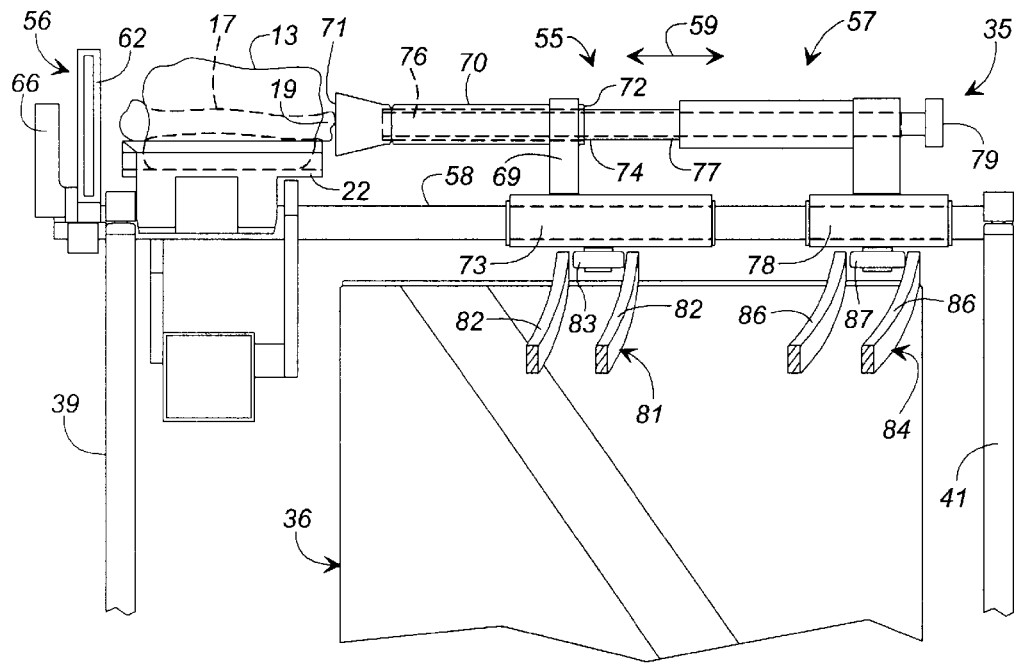
FIG. 4 is a side view of a deboning module showing its relationship with the cam drum and a carrier tray of the tray conveyor.
Figure 5:
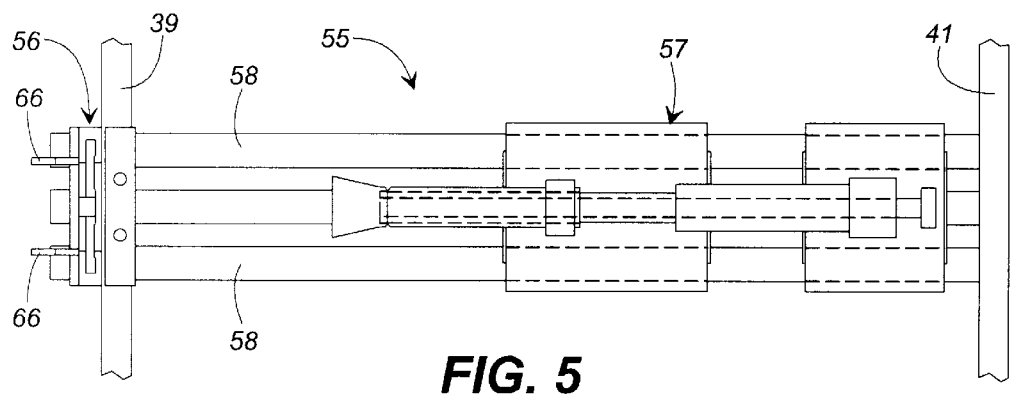
FIG. 5 is a top view of a deboning module, similar to FIG. 4.

As best shown in FIGS. 2, 4 and 5, a series of deboning modules 55 are supported by the end plates 39 and 41 and are arranged in spaced series about the circumference of the cam drum 36. Each of the deboning modules includes a pair of travel rods 58 mounted at their ends to end plates 39 and 41, a meat stripper disk assembly 56 mounted at one end of the pair of travel rods and a bone pusher assembly 57 that moves along the travel rods. The travel rods are arranged parallel to one another and to the axle 40 and typically are formed from steel or similar metal, and are mounted to and extend between the end plates 39 and 41, arranged in pairs.

As FIGS. 1 and 3 indicate, the tray conveyor 14 extends over and about the travel rods 58 of the deboning modules 55 of the deboning unit 35, with the arched depressions 34 (FIG. 12) of the carrier trays in engagement with the travel rods 58 so as to move with the movement of the deboning modules about the cam drum. The travel rods thus act as a drive sprocket that engages and drives the continuous tray conveyor 14 about its processing path.

Figure 6:
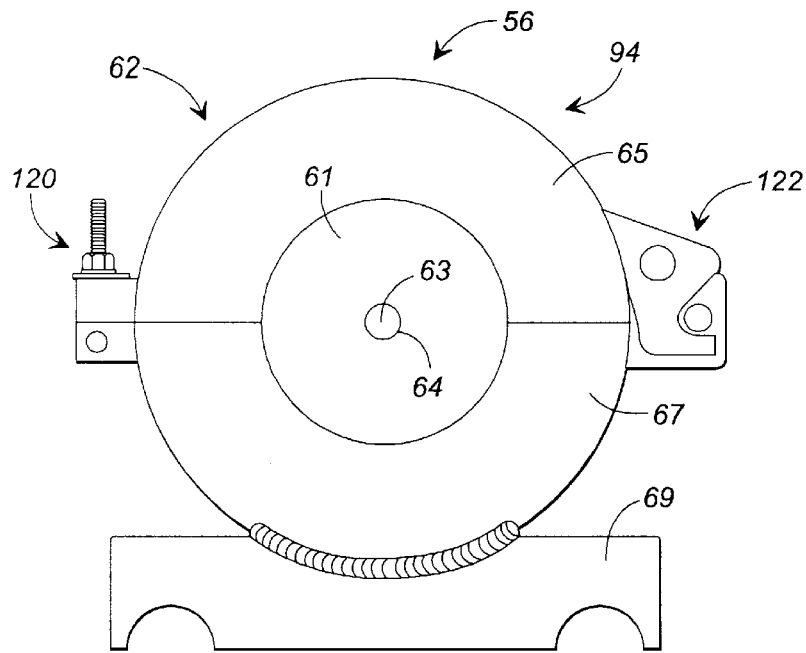
FIG. 6 is a front view of a meat stripper assembly.
Figure 7:
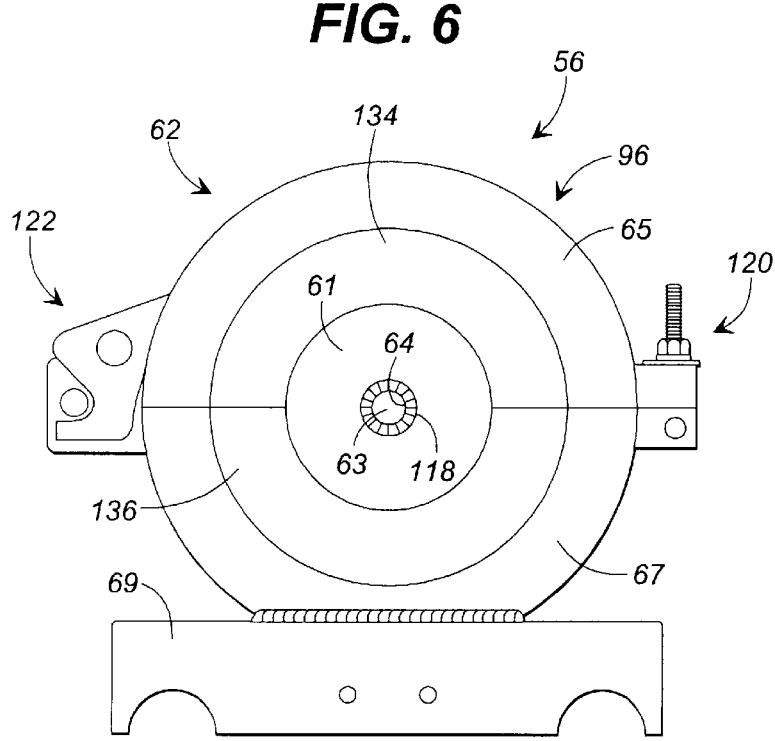
FIG. 7 is a rear view of the meat stripper assembly of FIG. 6.

FIGS. 4–7 illustrate the deboning module 55 with its meat stripper disk assembly 56 and bone pusher assembly 57 in greater detail. As FIGS. 4 and 5 illustrate, the meat stripper disk assembly 56 of each deboning module 35 is mounted to a pair of travel rods 58 in spaced series from one another about the circumference of the front rotatory end plate 39. As deboning unit 35 revolves about cam drum 36, each carrier tray 22 of the continuous tray conveyor 14 is moved onto a pair of travel rods and into alignment with a meat stripper disk assembly 56 and is maintained in alignment with the meat stripper disk as it is revolved about the cam drum of the deboning unit. FIGS. 6 and 7 show the front and rear sides 94 and 96 respectively, of the meat stripper disk assembly 56. As shown in these figures, each meat stripper disk assembly 56 includes a flexible stripper disk 61 formed from rubber or similar resilient material mounted in a holder 62 which is formed in a clam-shell configuration. The stripper disk holder 62 comprises upper and lower halves 65 and 67 that define an aperture 146 and a mounting block 69 with which it attaches to the ends of a pair of travel rods 58. An aperture 63 is formed in the center of each stripper disk 61 which becomes aligned with the semi-cylindrical recess 32 of a carrier tray as the carrier tray and aligned meat stripper disk are moved in timed relationship about the cam drum.

Figure 8:
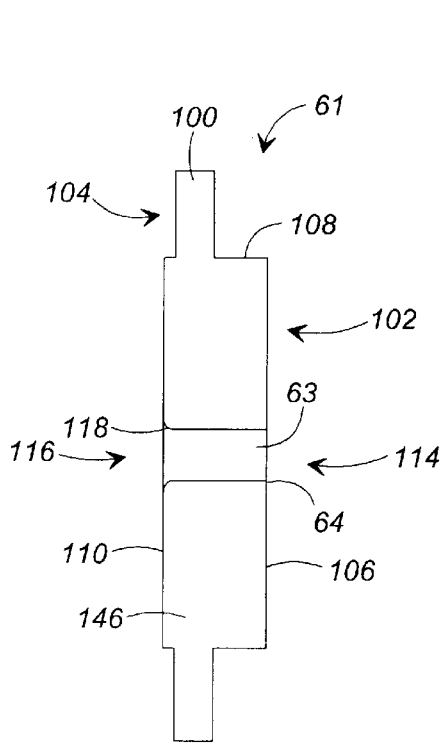
FIG. 8 is a side cross-sectional view of a stripper disk.

As depicted in cross-section in FIG. 7, each stripper disk 61 is generally disk shaped with a circular perimeter and comprises a disk body or central body portion 146 having a frontal extension 102 and a rear extension 104. Extending outwardly from the disk body is a substantially circular outer peripheral flange 100. In its initial state, the frontal extension 102 comprises a substantially planar front surface 106 and a substantially circular peripheral edge 108 which forms an annular surface. Similarly, the rear extension 104 comprises a substantially planar rear surface 110 and a substantially circular peripheral edge 112. As is evident in FIG. 8, the aperture 63 extends from the front surface 106 at an entrance opening 114 formed therein to an exit opening 116 formed in the rear surface 110 of the stripper disk 61. The aperture 63 is formed substantially cylindrically such that a substantially right-angled stripper edge 64 is formed in the front surface 106. The exit opening 116 of the rear surface 110 is formed by a substantially rounded edge 118.

Figure 9:
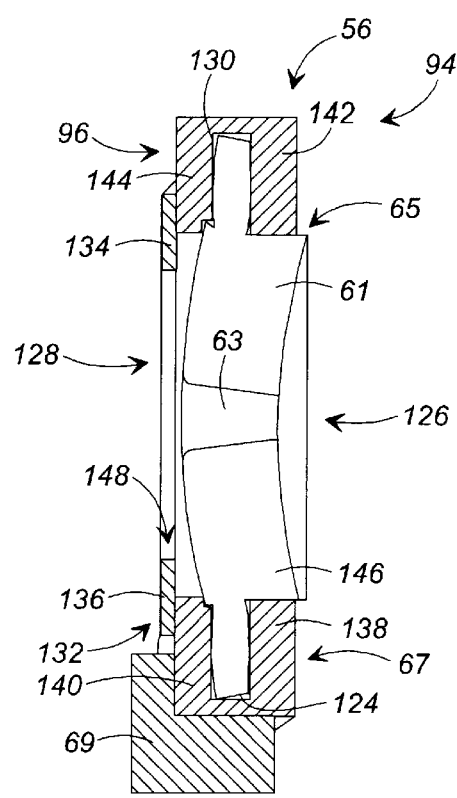
FIG. 9 is a side cross-sectional view of the meat stripper assembly.

FIG. 9 shows the stripper disk 61 mounted in the stripper disk holder 62. To effect this mounting, fastening means, such as a nut and bolt fastener 120, provided on the holder (FIGS. 6 and 7) is loosened and released so that the upper half 65 of the holder can be pivoted about a hinge 122 provided on the opposite side of the holder to place it in an open position (not shown). With the holder in the open position, the stripper disk 61 is fitted within the lower half 67 of the holder with the peripheral flange 100 fitted within a circular groove 124 formed by front and rear walls 138 and 140 of the lower half 67 of the holder. When correctly oriented in the lower half of the holder, the frontal extension 102 is positioned in a frontal opening 126 of the holder and the rear extension 104 is positioned in a rear opening 128 of the holder. Once the stripper disk is positioned in this manner, the upper half 65 of the holder is pivoted back toward the lower half 67 to rest on the stripper disk with a portion of the peripheral flange 100 fitted within a circular groove 130 formed by front and rear walls 142 and 144 of the upper half 65 of the holder.

Since the diameter of the frontal extension 102 is slightly larger than the diameter of the frontal opening 126 of the holder, upper half 65 does not meet flushly with the lower half 67 of the holder until the holder is clamped shut with the fastening means as shown in FIGS. 6 and 7. Due to the size difference of the frontal extension 102 of the disk and the frontal opening 126 of the holder, this tightening causes the stripper disk to bow such that when the two halves of the holder are closed about the stripper disk, the disk assumes a slightly domed shape shown in FIG. 9. As illustrated in this figure, the disk will bow toward the rear opening 128 of the holder due to the force exerted on the frontal extension 102. Bowed in this direction, the front surface 102 of the stripper disk forms a concave shape and the diameter of the entrance opening 114 of aperture is reduced while the diameter of the exit opening 116 of the aperture is increased to reconfigure the aperture in a frusto-conical or tapered shape.

Figure 10:
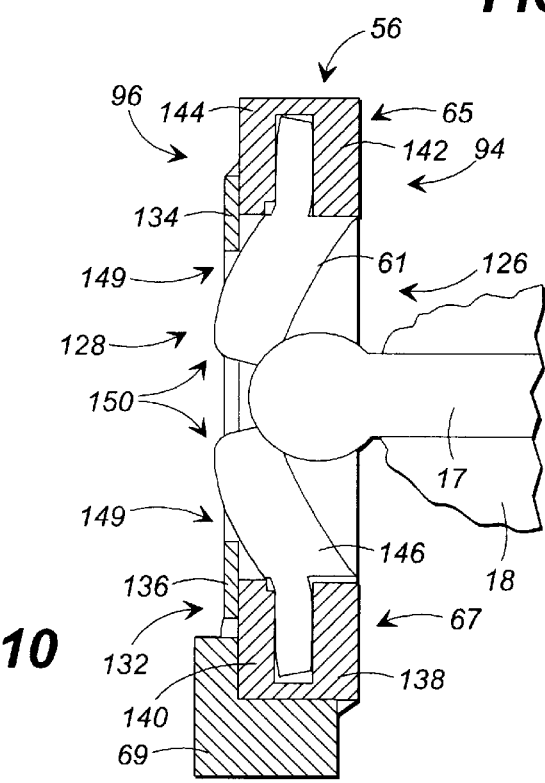
FIG. 10 is a side cross-sectional view of the meat stripper assembly of FIG. 9 showing a bone being passed therethrough.

In use, the aperture 63 of the stripper disk 61 receives the bones 17 of the poultry parts 13 as shown in FIG. 10. Each stripper edge 64 of each aperture 63 snugly engages the bone of each poultry part and will retard the passage of the meat 18 through the aperture. As a consequence, the bones will pass through the apertures and the meat of the poultry part will be progressively stripped from the bones. As can be appreciated from FIG. 10, the concave shape of the front surface 106 of the stripper disk helps facilitate alignment of the thigh bone 17 with the aperture 63. As is further evident from this figure, the tapered shape of the aperture 63 reduces the amount of disk mass which obstructs the passage of the bone through the aperture. This reduction of mass is necessary to avoid breaking the bone during the stripping operation.

As illustrated in FIG. 10, passage of the bone 17 through the aperture 63 causes the stripper disk to bow further toward the exit opening 116 of the holder 62. This additional bowing tends to cause the peripheral flange 100 to shift within the circular grooves 124 and 130 of the holder, increasing the potential for disk dislodgment. To prevent the disk from completely dislodging from the holder, the rear side 96 of the holder is provided with a ring shaped disk retainer 132 formed of upper and lower arcuate portions 134 and 136 which are mounted to the upper and lower halves 65 and 67 of the holder respectively. As shown in FIG. 10, this disk retainer forms a substantially circular opening 148 arranged concentrically with the exit opening 116 of the holder and axially displaced behind the stripper disk when the disk is not flexed by a poultry part being urged against the stripper disk. Since the diameter of the circular opening 148 is smaller than the diameter of the exit opening 116 of the holder, the disk retainer 132 functions as a disk retainer means for limiting the extent to which the disk will flex longitudinally when engaged by a poultry part to ensure that it does not pop out of the holder in the direction of travel of a bone 17 while the bone is urged through the aperture 63. Specifically, the ring shaped disk retainer engages an intermediate portion 149 of the rear surface of the stripper disk that is spaced radially outward of the exit opening 116 to prevent the stripper disk from dislodging from the disk holder without significantly retarding the flexure of a central portion 150 of the stripper disk.

A pair of bone guides 66 are mounted to the stripper disk assembly 56, positioned behind each stripper disk 61 and straddling the aperture formed within each stripper disk (FIG. 5). The bone guides 66 define a central opening of a sufficient diameter to enable the knuckles 19 and 21 of each bone 17 to pass therethrough without interfering, but yet restrict excess movement of the thigh bones from side to side or vertically during the stripping and separation of the meat therefrom.

As shown in FIGS. 4 and 5, each bone pusher assembly 57 is slidably mounted on a pair of travel rods 58, initially oriented in a position retracted from its meat stripper disk assembly 56, and aligned with the semi-cylindrical recess 32 formed in the carrier tray 22 of the continuous tray conveyor 14. Each bone pusher assembly 57 includes a hollow substantially cylindrical outer pusher sleeve 70 having an open front end 71 and an open rear end 72, and is mounted upon a carrier block 73 with a mounting block 69. The carrier block 73 is slidably mounted on the travel rods 58 to enable the outer pusher sleeve 70 to be moved laterally toward and away from its stripper disk assembly 56 in the directions of arrow 59 into engagement with a poultry thigh 13 positioned on its carrier tray 22.

A cylindrical inner pusher sleeve 74 is received and extends through each outer pusher sleeve 70, projecting rearwardly from the rear end 72 of each outer pusher sleeve. Each inner pusher sleeve 74 is slidably mounted within its outer pusher sleeve and has a front end 76 that telescopes into and out of the front end 71 of each outer pusher sleeve 70 to engage and urge the large knuckle end 19 of a bone 17 into the aperture 63 of its aligned stripper disk 61. A rear end 77 extends out the open rear end of each outer pusher sleeve and is mounted to a carrier block 78 with a mounting block 80. The carrier block is slidably mounted on the travel rods 58 for moving the inner pusher sleeve laterally in the direction of arrow 59 toward engagement with the bone. A cylindrical pusher rod 75 is received and extends through each inner pusher sleeve 74 and mounting block 80. As shown most clearly in FIG. 4, a rear end 79 of the pusher rod 75 extends beyond the mounting block 80.

As illustrated in FIGS. 2 and 4, a first cam tack 81 is formed about the cam drum 36 of the deboning unit 35, positioned beneath the outer pusher sleeve 70 of the deboning modules 55. The first cam track extends helically about the circumference of the cam drum and includes a pair of parallel upstanding side walls 82. A cam follower 83 is mounted to the bottom of the carrier block 73 of each pusher sleeve 70 and is received and rolls along the side walls 82 of the first cam track 81 as the deboning modules are revolved about the cam drum. As the cam followers 83 engage and roll along the first cam track, the outer pusher sleeves 70 are moved laterally in the direction arrow 59 toward and away from the carrier trays, causing the outer pusher sleeves to engage and urge the poultry parts 13 toward their aligned meat stripper disk assemblies 56.

A second helical cam tack 84 is formed about the cam drum 36 of the deboning unit 35, extending generally parallel to the first cam track 81 and having parallel upstanding side walls 86. A cam follower 87 is mounted to the bottom of each carrier block 78 for each inner pusher sleeve 74 and engages and rolls along side walls of the second cam track as the deboning modules are revolved about the cam drum. As the cam followers 87 of the carrier block 78 roll along the side walls 86 of the second cam track 84, the inner pusher sleeves 74 are moved in the direction of arrow 59, moving with their outer pusher sleeves 70 to engage and urge the bones poultry parts into the stripper disks 61, and to return to a retracted position.

As illustrated in FIG. 4, the first and second cam tracks 81 and 84 curve and extend diagonally toward the tray conveyor 22 as they extend around the cam drum 36 of the deboning unit 35, to cause the bone pusher assemblies 56 to move along their travel rods 58 into engagement with the poultry parts 13 on the carrier trays 22 during a meat stripping operation. The cam tracks then extend along a substantially straight path as the bones 17 are pushed through the apertures 63 of the stripper disk 61, separating them from the meat. When the pusher sleeves 70 and 74 are in the fully extended position, a cam wheel 37 (FIG. 2) urges the rear end 79 of the pusher rod 75 forwardly so that it will extend beyond the inner pusher sleeve 74 to force the bone completely through the aperture 63. Thereafter, the cam tracks 81 and 84 begin to curve and extend diagonally away from the tray conveyor 22 (not shown) to cause the bone pusher assemblies 55 to return to their retracted, loading positions. Additionally, a wedge (not shown) retracts the rear end 79 of the pusher rod 75 to its initial loading position.

Typically, the separation of the bones and meat is completed with a knife which severs any tendons or other tissue attached to the bone (not shown). The bones and meat are then dropped out of the bottom of the poultry thigh deboner and kept separate by a separator plate (not shown). A removal conveyor (not shown) or other collection means can be positioned below the poultry thigh deboner so as to catch the bones and meat for collection and removal for inspection and further processing as needed.

Figure 14:
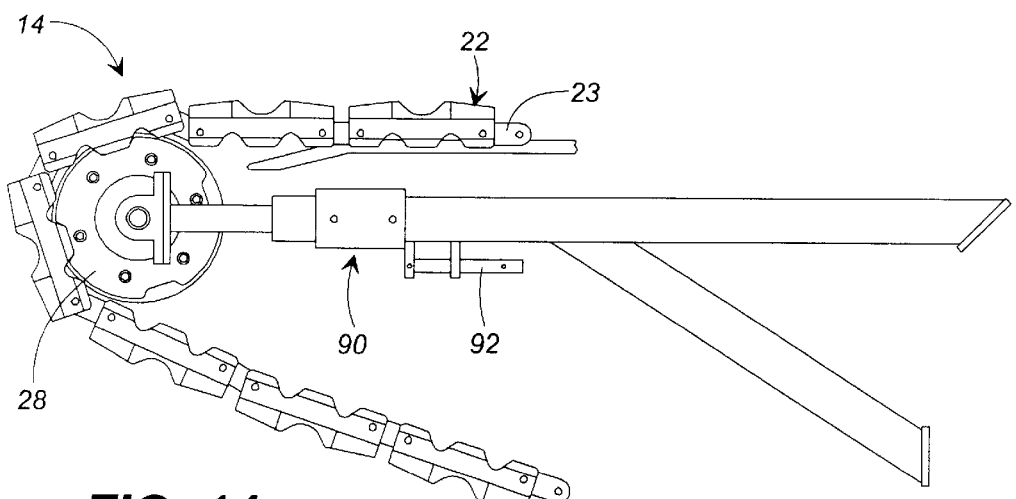
FIG. 14 is a side view of a portion of the continuous tray conveyor.

As illustrated in FIGS. 1 and 14, a conveyor tensioner 90 is mounted to the support framework 11 adjacent the loading and 23 of the tray conveyor 14. The tensioner generally includes a bracket 91 slidably mounted to the framework and attached at one end to the idler sprocket 28 of the tray conveyor. A travel screw 92 is attached to the bracket for moving the extension bracket longitudinally with respect to the framework to move the idler sprocket of the tray conveyor longitudinally in order to take up or create slack within the tray conveyor.

In addition, the construction of the poultry thigh deboner 10 of the present invention advantageously enables the expansion of the tray conveyor 14 by the addition of extra carrier trays 22 to the tray conveyor and a longer extension bracket 90 to the framework. As a result, the quantity of carrier trays 22 on the tray conveyor can be increased so that more than one operator can be stationed at the loading run 24 to enable increased numbers of poultry parts to be loaded onto the poultry deboner. As a result, the number of parts being processed through the poultry deboner can be significantly increased and the speed of revolution of the carrier assembly about the cam drum accordingly increased to increase the production capacity of the poultry deboner.

While the disk retainer means is disclosed herein as being a segmented ring displaced from the stripper disk to block the longitudinal movement of the disk, other shapes and structures can be used to limit the longitudinal movement of the stripper disk, to avoid inadvertent removal of the stripper disk.

Therefore, it will be understood by those skilled in the art that while the present invention has been disclosed with reference to a preferred embodiment, various modifications, changes and additions can be made thereto without departing from the spirit and scope of the invention.

We claim:

1. A meat stripper disk assembly for stripping meat from poultry bones, comprising:

a stripper disk holder having a front side and a rear side, said front side being provided with a substantially circular frontal opening and said rear side being provided with a substantially circular exit opening, said openings being joined by an aperture which extends through said stripper disk holder;

a substantially circular, resilient stripper disk having a disk body, a front surface, and a rear surface, said front surface being provided on a frontal extension which extends from said disk body, said front surface having an entrance opening defined by a stripper edge, said rear surface having an exit opening, said openings of said front and rear surfaces being joined by an aperture which extends through said stripper disk;

a disk retainer mounted to said rear side of said stripper disk holder, said disk retainer being axially displaced from said stripper disk and of smaller breadth than said exit opening of said stripper disk holder; and means for compressing said stripper disk in said stripper disk holder such that said stripper disk is bowed outwardly towards said exit opening of said stripper disk holder and said front surface is substantially concave;

wherein said disk retainer will prevent said stripper disk from dislodging from said stripper disk holder when the stripper disk is stretched due to the urging of a poultry part against said stripper disk.

2. The meat stripper disk assembly of claim 1, wherein said frontal extension is substantially circular and has a diameter slightly larger than the diameter of said entrance opening of said stripper disk holder so that said frontal extension is held in compression by said entrance opening of said stripper disk holder.

3. The meat stripper disk assembly of claim 1, wherein said entrance and exit openings of said stripper disk are substantially circular, and wherein the diameter of said entrance opening of said stripper disk is smaller than the diameter of said exit opening of said stripper disk when said disk is mounted in said holder such that said aperture formed in said stripper disk is frusto-conical.

4. The meat stripper disk assembly of claim 1, wherein said disk retainer is substantially ring shaped and has a substantially circular opening arranged concentrically with said exit opening of said stripper disk holder, said circular opening having a diameter smaller than the diameter of the exit opening of said stripper disk holder.

5. The meat stripper disk assembly of claim 1, wherein said stripper disk holder has front and rear walls which define an inner circular groove and said stripper disk includes a substantially circular outer peripheral flange extending radially from said disk body, said peripheral flange being positioned in said inner circular groove.

6. The meat stripper disk assembly of claim 1, wherein said stripper disk holder comprises two separate halves connected by a hinge.

7. The meat stripper disk assembly of claim 6, wherein said means for compressing said stripper disk comprises a fastener mounted to said stripper disk holder opposite said hinge, wherein tightening of said fastener causes said stripper disk to be compressed between said two separate halves of said stripper disk holder.

8. The meat stripper disk assembly of claim 1, wherein said resilient stripper disk is made of rubber.

9. A meat stripper disk assembly for stripping meat from poultry bones, comprising:

a stripper disk holder having a front side and a rear side, said front side being provided with a frontal opening and said rear side being provided with an exit opening, said openings being joined by an aperture which extends through said stripper disk holder;

a resilient stripper disk having a disk body, a front surface, and a rear surface, said front surface being provided on a frontal extension which extends from said disk body, said front surface having an entrance opening defined by a stripper edge, said rear surface having an exit opening, said openings of said front and rear surfaces being joined by an aperture which extends through said stripper disk, said stripper disk being mounted in said stripper disk holder in a compressive manner; and retainer means positioned on said rear side of said stripper disk holder for retaining said stripper disk in said holder to prevent said disk from dislodging from said holder.

10. The meat stripper disk assembly of claim 9, wherein said retainer means comprises a ring shaped retainer mounted to said rear side of said stripper disk holder.

11. The meat stripper disk assembly of claim 10, wherein said ring shaped retainer surrounds said exit opening of said stripper disk holder and includes an opening which is smaller than said exit opening of said stripper disk holder.

12. A bone pusher assembly for urging a poultry bone through a meat stripper disk assembly having a stripping aperture, said bone pusher assembly comprising:

a front carrier block and a rear carrier block, each carrier block being provided with a cam follower adapted to engage first and second cam tracks respectively;

a hollow outer pusher sleeve having a front end and a rear end and being mounted to said front carrier block;

a hollow inner pusher sleeve having a front end and a rear end and being mounted to said rear carrier block and disposed within said outer pusher sleeve; and a pusher rod having a front end and a rear end and being disposed within said inner pusher sleeve;

wherein said outer pusher sleeve, said inner pusher sleeve, and said pusher rod can be advanced forwardly towards the meat stripper disk assembly by the cam tracks with said inner pusher sleeve being advanced to a further extent than said outer pusher sleeve so as to extend beyond the front end of said outer pusher sleeve to force the bone into the stripping aperture of the stripper disk assembly and with said pusher rod advanced beyond said front end of said inner pusher sleeve by a cam to force the bone completely through the stripping aperture of the stripper disk assembly.

13. A meat stripper disk assembly for stripping meat from poultry bones, comprising:

a stripper disk holder having a front side and a rear side, said front side being provided with a frontal opening and said rear side being provided with an exit opening, said openings being joined by an aperture which extends through said stripper disk holder;

a resilient stripper disk mounted in said stripper disk holder within said aperture, said stripper disk having a disk body including a central portion, a front surface, and a rear surface, said front surface having an entrance opening defined by a stripper edge, said rear surface having an exit opening and an intermediate portion spaced radially outward from said exit opening, said openings of said front and rear surfaces being joined by an aperture which extends through said central portion of said stripper disk; and a stripper disk retainer mounted to said rear side of said stripper disk holder and being axially spaced from said stripper disk when said disk is in an initial orientation;

wherein if said stripper disk flexes in a rearward axial direction in response to a poultry part being urged against said front surface of said stripper disk, said disk retainer will engage said intermediate portion of the rear surface of said stripper disk to prevent said stripper disk from dislodging from said stripper disk holder without substantially retarding the flexure of said central portion of said disk.

14. A meat stripper assembly for stripping meat from poultry bones, comprising:

a stripper holder having a front side and a rear side, said front side being provided with a frontal opening and said rear side being provided with an exit opening, said openings being joined by an aperture which extends through said stripper holder;

a stripper mounted in said stripper holder within said aperture, said stripper having a body including a central portion, a front surface, and a rear surface, said front surface having an entrance opening defined by a stripper edge, said rear surface having an exit opening and an intermediate portion spaced radially outward from said exit opening, said openings of said front and rear surfaces being joined by an aperture which extends through said central portion of said stripper;

said stripper being formed of resilient material which flexes rearwardly in response to a poultry bone with meat attached thereto is forced through said aperture;

a stripper retainer mounted behind said stripper holder and being axially spaced from said stripper when said stripper is in an initial orientation before a poultry bone with meat attached thereto is forced through said aperture; and wherein if said stripper flexes in a rearward axial direction in response to a poultry part being urged against said front surface of said stripper, the intermediate portion of the rear surface of said stripper will be engaged by said stripper retainer to prevent said stripper from dislodging from said stripper holder.

15. The meat stripper assembly of claim 14, wherein said stripper retainer has a substantially circular opening arranged concentrically with said exit opening of said stripper holder, said circular opening of said stripper retainer having a larger breadth than the exit opening of said stripper.

* * * * *